J. W. DRUMMOND.
Cloth Measuring Machine.
No. 24,260.
2 Sheets—Sheet 1.
Patented May 31, 1859.
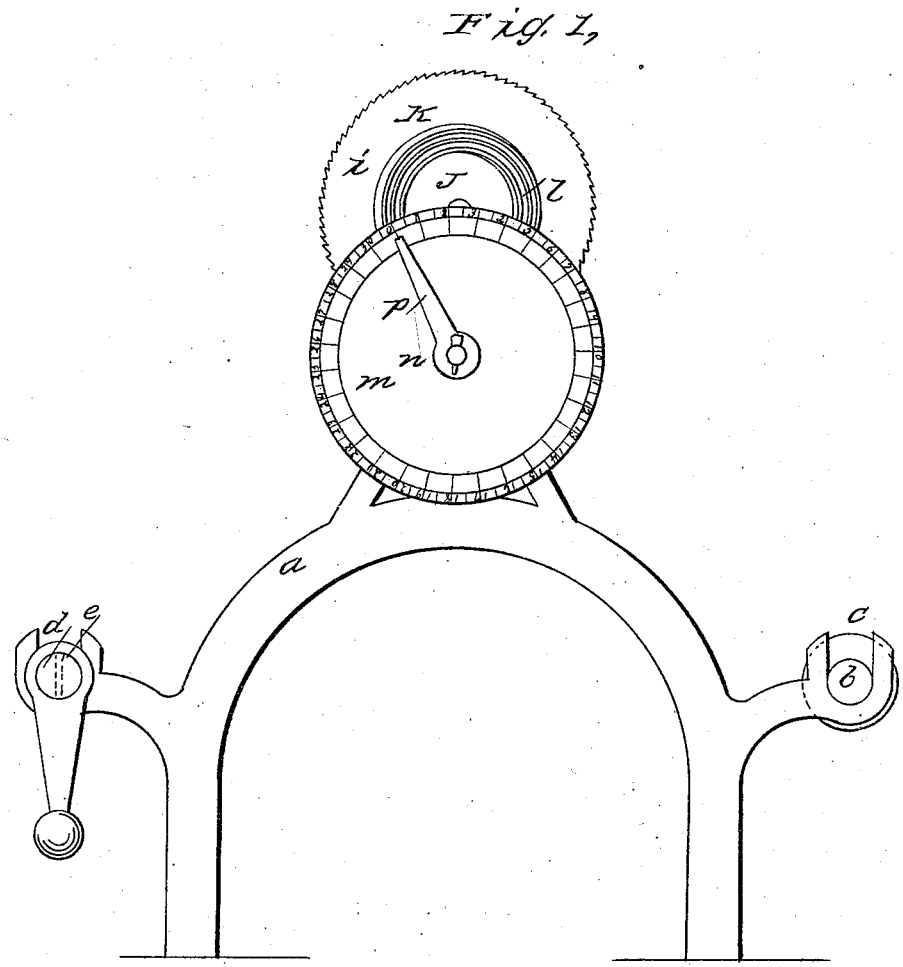

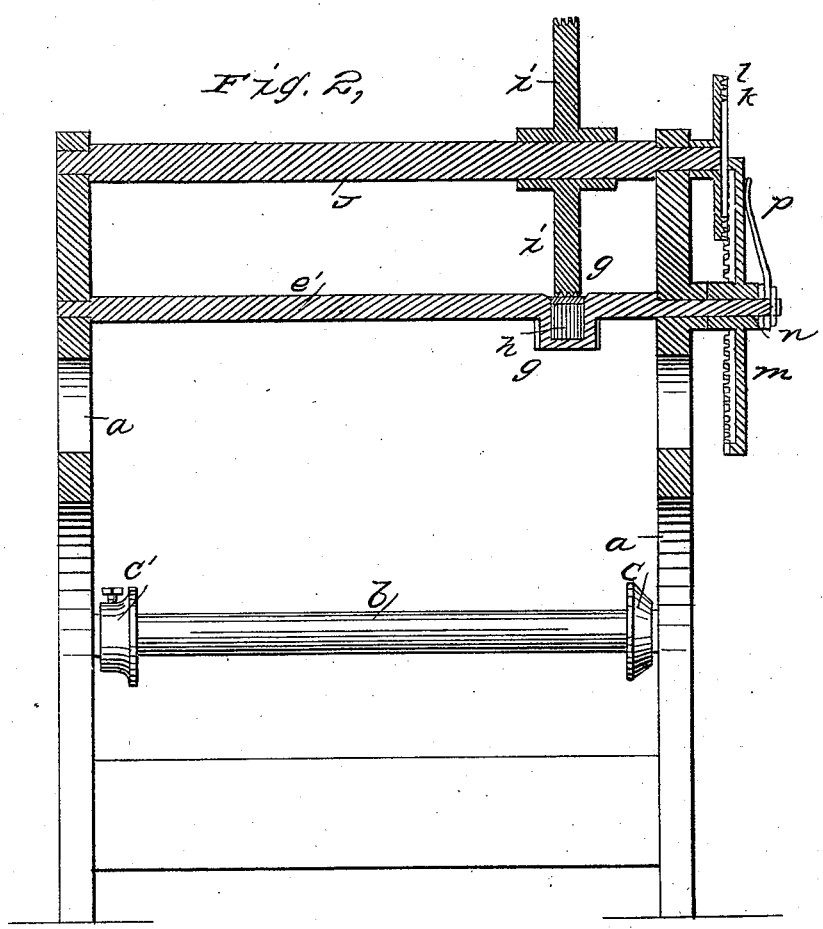

UNITED STATES PATENT OFFICE.

JOHN W. DRUMMOND, OF NEW YORK, N. Y., ASSIGNOR TO H. H. DAY, OF SAME PLACE.

MACHINE FOR MEASURING CLOTH.

Specification of Letters Patent No. 24,260, dated May 31, 1859.

*To all whom it may concern:*

Be it known that I, JOHN W. DRUMMOND, of the city, county, and State of New York, have invented a certain new and useful Machine for Measuring Cloth; and I do hereby declare that the following is a full, clear, and exact description thereof, reference being had to the accompanying drawings, making part of this specification, in which—

Figure 1, is a side elevation; and Fig. 2, a longitudinal vertical section taken in the plane of the measuring wheel.

The same letters indicate like parts in all the figures.

My said invention relates to the measuring of cloth in the piece, and consists in passing the cloth in the direction of its length between the periphery of a measuring wheel, and a pressure block, the periphery of the said wheel being formed with fine teeth, or roughened, or otherwise so formed as to be turned by the movement of the cloth, so long as it is held in contact therewith by the spring block.

In the accompanying drawings (*a*) represents a suitable frame, and (*b*) a shaft mounted and turning freely in suitable bearings at the back of the frame, and provided with two collars (*c, c′*) between which the cloth to be measured is wound, one of the said collars (*c′*), for convenience, being adjustable along the shaft and secured in place by a temper screw. In front there is another shaft (*d*) mounted in like manner, and slotted as at (*e*) shown by dotted lines in Fig. 1, to receive the end of, or otherwise provided with suitable means for taking hold of the end of, the piece of cloth to be measured this said shaft having a crank at one end by which it can be turned to wind up the cloth as it is drawn from the other shaft (*b*).

In the middle of the machine and elevated above the shaft (*b*) and (*d*) there is a bar (*e′*) which extends across and is fastened to the frame, its upper surface being rounded and smooth that the cloth to be measured may slide over it freely. A recess in formed in some suitable part of the upper surface of this bar in which is fitted a block (*g*) that straddles the recessed part with a spring (*h*) interposed the tension of which has a constant tendency to press the block upwards against the underside of the periphery of a measuring wheel (*i*) on a shaft (*j*) mounted in suitable boxes in the upper part of the frame and directly above the bar (*e′*). The periphery of this wheel is formed with fine teeth, or roughened, or otherwise so formed as to prevent the cloth from slipping under it when pressed up by the block (*g*). The circumference of this wheel should be of a definite measured length, half a yard being a convenient measure. The shaft (*j*) of the measuring wheel carries a wheel (*k*) outside the frame, the face of which wheel is formed with a volute fillet (*l*) which engages cogs on the inner face of a dial wheel (*m*) which turns so freely on a stud (*n*) that by pulling it from the volute wheel the cog will become disengaged from the volute fillet and when liberated is forced into gear with the said volute fillet by the tension of a spring (*p*) attached to the stud (*n*), the said spring (*p*) serving the additional purpose of a pointer or index hand.

The face of the dial wheel is divided into yards and fractions of yards, and numbered, or instead the dial wheel may be divided into yards and the fractions of yards marked on the face of the measuring wheel. The divisions should be suited to the circumference of the measuring wheel, the pitch of the volute fillet, and the cogs on the dial plate. If for instance the measuring wheel be half a yard in circumference the volute and cogs and divisions on the dial may be so proportioned that each revolution of the measuring wheel will move the dial one division leaving the fractions less than half a yard to be indicated by suitable marks on the face of the measuring wheel; or each turn of the measuring wheel may move the dial by the pointer several fractional divisions, but the divisions and proportions may be modified at the discretion of the constructor.

To operate the machine a piece of cloth to be measured is put on the shaft (*b*) and the collar (*c′*) slipped and secured against the end of the roll to hold it in place. The end of the cloth is passed over the bar (*e′*) and spring block (*g*) and under the measuring wheel and thence carried down and secured to the other shaft (*d*). Before the end of the cloth is put between the measuring wheel and spring pressure block, the dial wheel should be turned to bring 0 opposite the pointer, and if there be any fractional divisions on the measuring wheel to bring the 0, of such divisions on the measuring wheel to bring the 0, of such division opposite the spring block. The end of the cloth being then drawn down and secured to the shaft (*d*) and that shaft turned, the cloth will be drawn from the shaft (*b*) and wound up on the shaft (*d*) and in passing under the measuring wheel will cause that to turn, and impart motion to the dial wheel, and the moment the other end of the cloth passes from under the measuring wheel the spring block (*g*) will be forced up into contact with the measuring wheel and instantly stop it from turning, and then the number of yards and fractions of yards which have passed under the measuring wheel can be taken from the index.

Having thus described the mode of application of my said invention which I have adopted, I do not wish to be understood as limiting my claim of invention to such specific mode of construction and application as these may be varied without materially changing the principle of my said invention. Nor do I wish to be understood as making claim to the use of a measuring wheel with a toothed periphery carried by the motion of the cloth to be measured, nor the connection of such measuring wheel with an index or pointer—nor do I wish to be understood as claiming such measuring wheel and index in connection with every means of pressing the cloth to the periphery of the wheel as I am aware that in some instances a pressure roller has been used to press the cloth in contact with the periphery of the measuring wheel, and that in other instances it has been proposed to use a cap or bar under which the selvage of the cloth must pass to hold it on to pins projecting from the periphery of the measuring wheel. But all these methods are defective for the reason that in them the instrument or device for holding the cloth to the measuring wheel does not and cannot perform the function of stopping the measuring wheel the instant the end of the cloth passes off, and in consequence the measuring wheel continues to move for some time after the cloth has passed thus causing the index to indicate more than the length of cloth which has passed through; and this is especially the case in machines used for measuring cloths after they have been woven; in which machines rapidity of movement is important, although the defect may not be so great in measuring cloth as it is woven in the loom.

Therefore what I claim as my invention and desire to secure by Letters Patent is—

The combination of the measuring wheel, substantially as described, in combination with the spring block, or the equivalent thereof for holding the cloth to the periphery of the wheel, and for stopping the said wheel the moment the cloth has passed off, substantially as described.

JOHN W. DRUMMOND.

Witnesses:
C. A. SEWARD,
A. A. ATOCHO.